United States Patent
Lee et al.

(10) Patent No.: US 8,781,266 B2
(45) Date of Patent: Jul. 15, 2014

(54) DISTRIBUTED, MULTIPLEXED FIBER OPTIC CURRENT TRANSDUCER USING OPTICAL POWER DIVISION

(75) Inventors: Boon Kwee Lee, Clifton Park, NY (US); Glen Peter Koste, Niskayuna, NY (US); Sachin Narahari Dekate, Niskayuna, NY (US); Victor Welch, Newtown, CT (US)

(73) Assignee: General Electric Company, Niskayuna, NY (US)

( * ) Notice: Subject to any disclaimer, the term of this patent is extended or adjusted under 35 U.S.C. 154(b) by 120 days.

(21) Appl. No.: 13/336,519

(22) Filed: Dec. 23, 2011

(65) Prior Publication Data

US 2013/0163915 A1 Jun. 27, 2013

(51) Int. Cl.
*G02B 6/00* (2006.01)

(52) U.S. Cl.
USPC .................................. 385/12; 365/31; 365/37

(58) Field of Classification Search
USPC ............................... 385/12, 31, 37
See application file for complete search history.

(56) References Cited

U.S. PATENT DOCUMENTS

| | | | |
|---|---|---|---|
| 5,136,235 A | | 8/1992 | Brandle et al. |
| 5,953,121 A | * | 9/1999 | Bohnert et al. ............... 356/481 |
| 6,114,846 A | * | 9/2000 | Bosselmann et al. ........... 324/96 |
| 6,404,503 B1 | * | 6/2002 | Sardo .............................. 356/477 |
| 7,633,285 B2 | * | 12/2009 | Rahmatian et al. ............ 324/107 |
| 7,655,900 B2 | * | 2/2010 | Kurosawa et al. ........ 250/227.14 |
| 2003/0117126 A1 | * | 6/2003 | Rahmatian ....................... 324/96 |
| 2007/0278389 A1 | * | 12/2007 | Ajgaonkar et al. ............ 250/221 |
| 2008/0101157 A1 | * | 5/2008 | Ronnekleiv et al. ............. 367/64 |
| 2011/0060544 A1 | | 3/2011 | Wu et al. |

FOREIGN PATENT DOCUMENTS

| | | | | | |
|---|---|---|---|---|---|
| CH | 671638 A | * | 9/1989 | ............. | G01R 15/07 |
| CN | 1687794 A | | 10/2005 | | |
| CN | 101770858 A | | 7/2010 | | |

OTHER PUBLICATIONS

Hino et al., "Tests of Optical Fiber Current Transformer for Direct Currents", The Fifth International Conference on Power Electronics and Drive, pp. 284-286, vol. 1, Nov. 17-20, 2003.

Oh et al.,"Optical Current Sensors Consisting of Polymeric Waveguide Components", Journal of Lightwave Technology, pp. 1851-1857, vol. 28 Issue 12, Jun. 15, 2010.

* cited by examiner

*Primary Examiner* — Ellen Kim
(74) *Attorney, Agent, or Firm* — Nitin N. Joshi (57) ABSTRACT

A measurement system includes a broadband light source that outputs a broadband light, an optical splitter that divides the broadband light into a plurality of divided light beams and a plurality of optical sensors, each optical sensor configured to receive a single one of the divided light beams and measure an electrical parameter of a conductor.

20 Claims, 6 Drawing Sheets

DISTRIBUTED, MULTIPLEXED FIBER OPTIC CURRENT TRANSDUCER USING OPTICAL POWER DIVISION

BACKGROUND OF THE INVENTION

The field of the present disclosure relates generally to fiber optic current transducers based on the Faraday effect. More particularly, the present disclosure relates to distributed, multiplexed fiber optical current transducers using optical power division.

Fiber optic current transducers (FOCT) measure current based on the Faraday effect. The Faraday effect is a magneto-optical phenomenon (i.e., the interaction of light with a medium in a magnetic field). The interaction of light with the medium in a magnetic field causes a rotation of the plane of polarization of the light by an angle that is linearly proportional to the component of the magnetic field in the direction of propagation of the light.

Typically, FOCT systems support only a single flint glass fiber and are capable of measuring only single phase electrical current. In order to measure multiple phases of electrical current, multiple FOCT systems are required. The use of multiple FOCT systems to measure current increases cost and reduces efficiency.

BRIEF DESCRIPTION OF THE INVENTION

In one aspect, a measurement system includes a broadband light source that outputs a broadband light, an optical splitter that divides the broadband light into a plurality of divided light beams and a plurality of optical sensors, each optical sensor configured to receive a single one of the divided light beams and measure an electrical parameter of a conductor.

In another aspect, a measurement system includes a broadband light source that outputs a broadband light, an optical splitter that divides the broadband light into a plurality of divided light beams based upon wavelength, and a plurality of optical sensors, each optical sensor configured to receive a single one of the divided light beams and measure an electrical parameter of a conductor using the received light beam.

In yet another aspect, a method of measuring an electrical parameter using an optical sensor includes outputting a broadband light from a single broadband light source, dividing the broadband light into a plurality of divided light beams based upon a predetermined characteristic of the light, supplying the divided light beams to a plurality of optical sensors, passing a conductor through at least one of the optical sensors, and measuring an electrical parameter of the conductor using the at least one of the optical sensors having the conductor passing therethrough.

BRIEF DESCRIPTION OF THE DRAWINGS

In the Figures, like components are referred to by like reference numerals.

DETAILED DESCRIPTION OF THE INVENTION

The distributed, multiplexed fiber optic current transducer systems of the present disclosure allows for the possibility to support multiple FOCT sensors for multiphase electrical current measurement using a single broadband light source.

Figure 1:
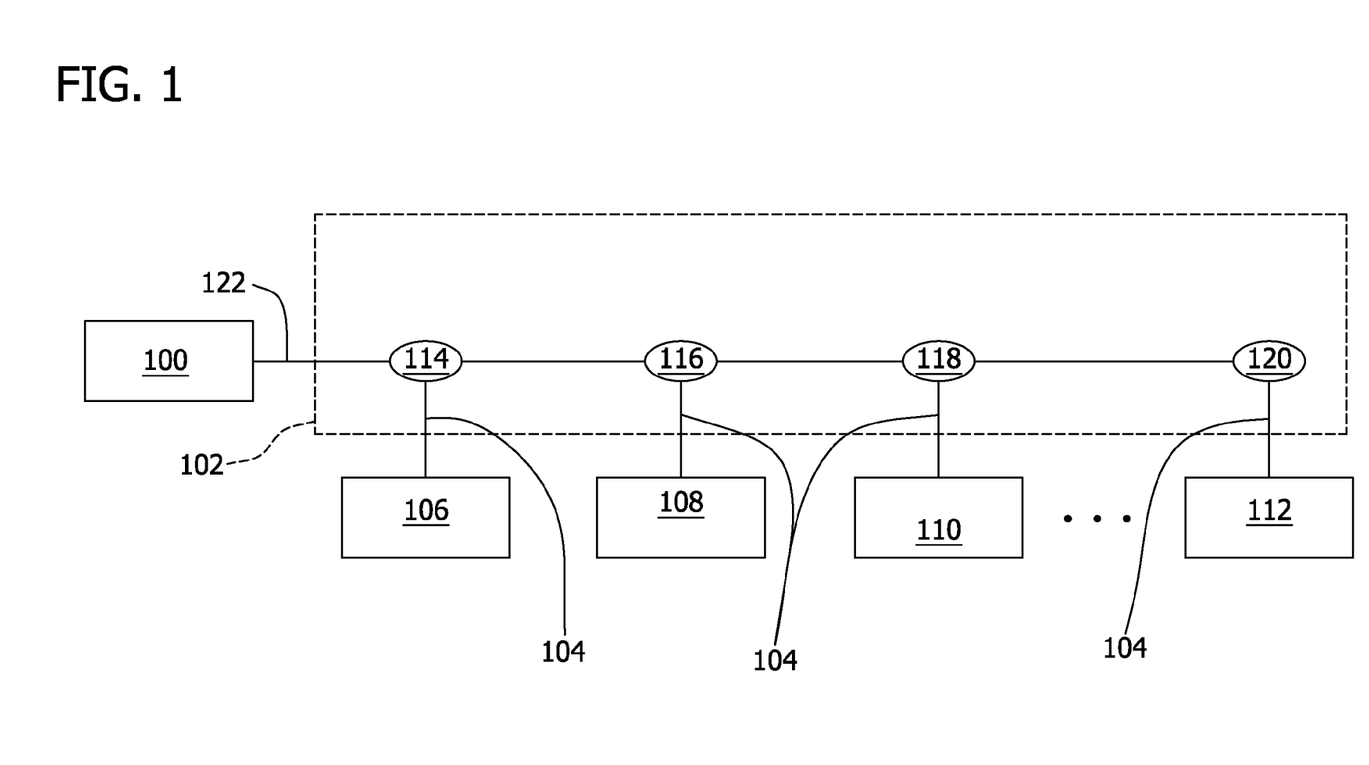
FIG. 1 shows a first exemplary embodiment of a light based electrical parameter measurement system according to the present disclosure.

FIG. 1 shows a first exemplary embodiment of a light based electrical parameter measurement system. The system includes a broadband light source 100 that outputs a broadband light having wavelengths $\lambda B$. In one embodiment, the broadband light source is a super luminescent diode (SLD). In another embodiment, broadband light source 100 is an amplified spontaneous emission (ASE). In other embodiments, broadband light source 100 is any broadband light source that enables the system to function according to the present disclosure. Broadband light source 100 outputs a broadband light to an optical splitter 102 that divides the broadband light into a plurality of divided light beams 104. Optical splitter 102 is optically coupled (e.g., by fiber optic cable) to a plurality of optical sensors 106, 108, 110 and 112. Although four optical sensors are depicted in FIG. 1, in other embodiments, two or more optical sensors are used.

In one embodiment, optical splitter 102 includes a plurality of optical circulators 114, 116, 118 and 120 that correspond to one of the optical sensors 106, 108, 110 and 112. In one embodiment, optical splitter 102 is replaced by an optical coupler. In one embodiment, one or more of optical circulators 114, 116, 118 and 120 are fiber-optic circulators configured to separate optical signals that travel in opposite directions in an optical fiber 122. In one embodiment, optical circulators 114, 116, 118 and 120 are three-port circulators that allow light entering one port to exit from another port. Circulators 114, 116, 118 and 120 thereby provide bi-directional transmission over a single fiber optic cable.

Figure 2:
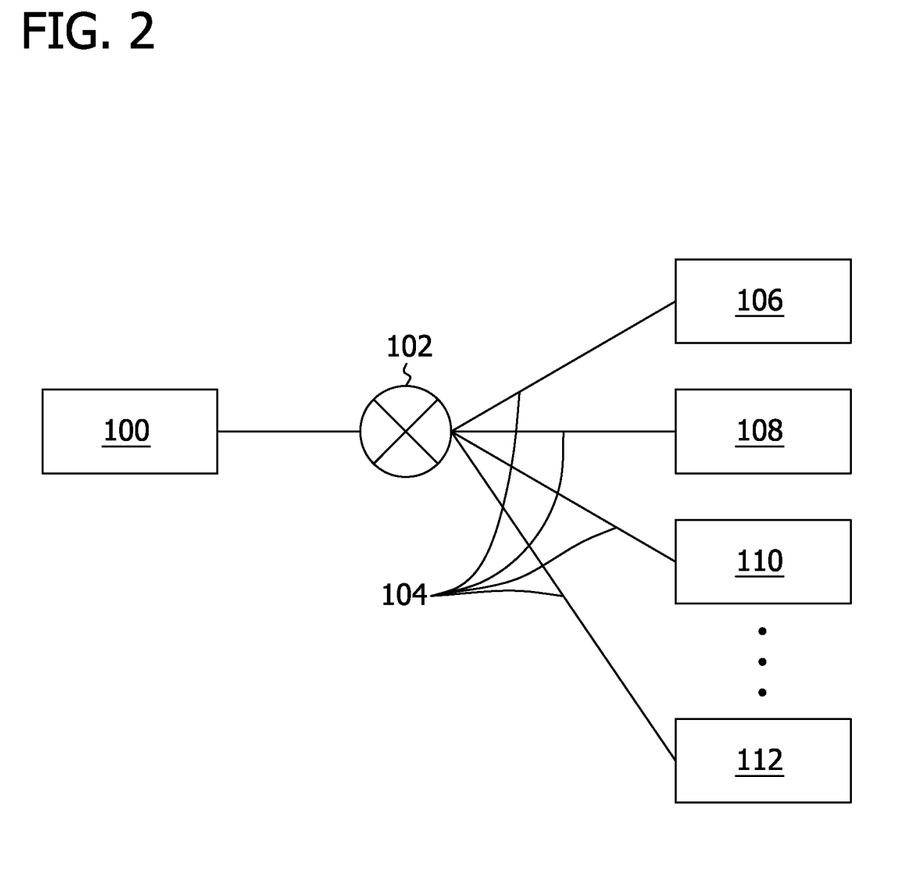
FIG. 2 shows a second exemplary embodiment of a light based electrical parameter measurement system according to the present disclosure.

FIG. 2 shows a second exemplary embodiment of a light based electrical parameter measurement system. In one embodiment, optical splitter 102 is a wavelength division multiplexer. The wavelength-division multiplexer (WDM) is configured to multiplex broadband light from broadband light source 100 into a plurality of divided light signals 104 each having different wavelengths (i.e., colors) of light. Divided light signals are provided to a corresponding one of optical sensors 106, 108, 110 and 112 via an optical cable, such as a fiber optic cable.

Figure 3:
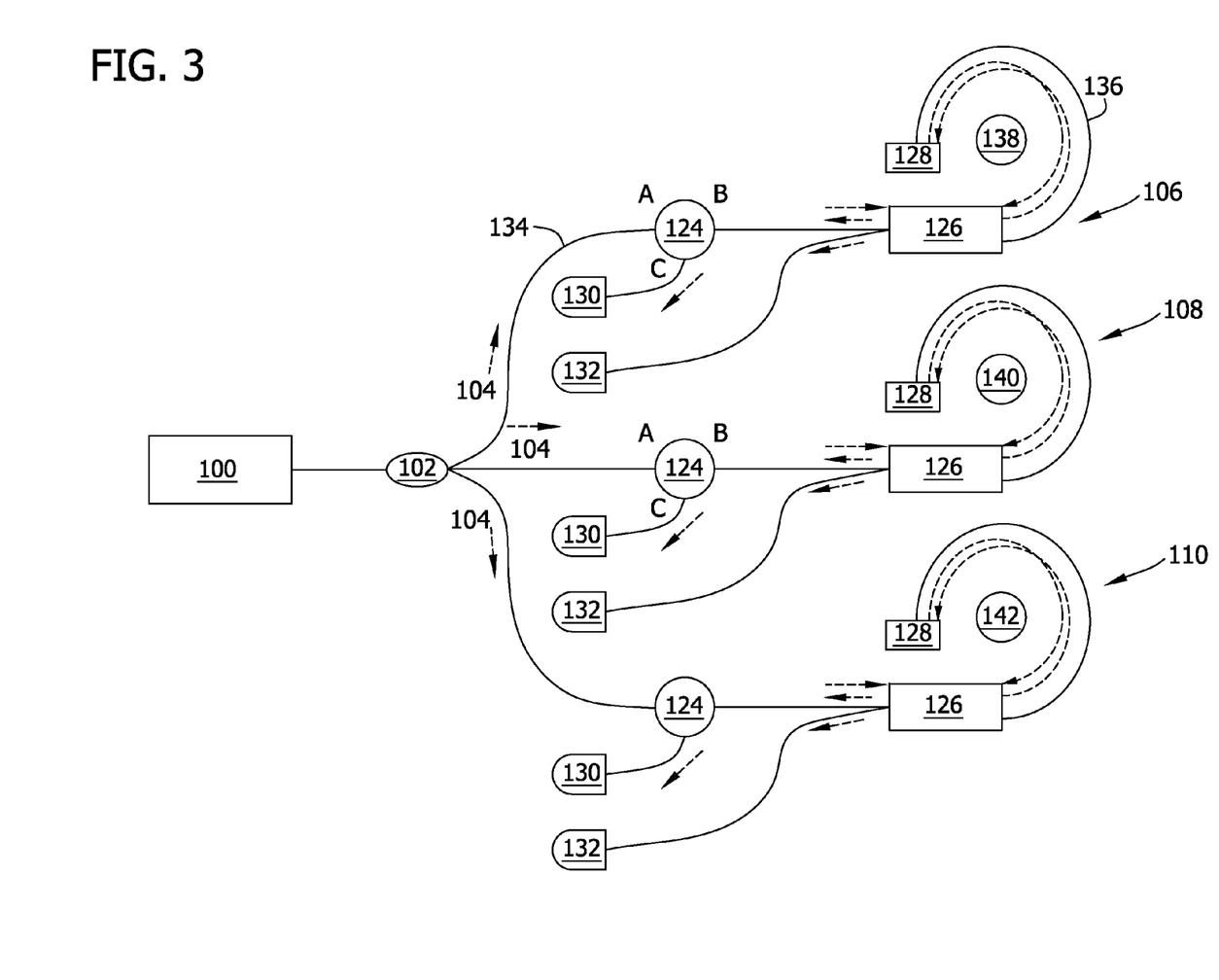
FIG. 3 shows an exemplary embodiment of the system of FIG. 2 using an optical splitter.

In the embodiment shown in FIG. 3, optical splitter 102 is an intensity division multiplexer. The intensity division multiplexer is configured to divide broadband light from broadband light source 100 into a plurality of divided light signals 104 each having an intensity less than an output intensity of broadband light source 100. The sum of the intensity of divided light signals 104 is equal to the total output intensity of broadband light source 100. In one embodiment, each divided light signal 104 is supplied to a corresponding optical sensor 106, 108 and 110. In one embodiment, one or more of optical sensors 106, 108 and 110 are a fiber optic current transducer (FOCT). Each FOCT includes a circulator 124, optical box 126, reflection surface 128 and detectors 130 and 132. In operation, divided light signal 104 is supplied to circulator 124 via a fiber optic cable 134. Light signal 104 enters circulator 124 through port A and exits via port B. Light signal 104 enters optical box 126, and is transmitted through flint glass fiber 136, and the light reflects off of reflective surface 128 and returns to optical box 126 via flint glass fiber 136. When current is supplied to conductor 138 (conductor 138 passes through optical sensor 106) a polarization angle of light signal 104 is rotated by an amount proportional to a magnitude of the electrical current passing through conductor 138 (i.e., the Faraday effect). Optical box 126 then outputs the rotated light as two different polarizations (i.e., x-polarization and y-polarization) to detectors 130 and 132, respectively. In one embodiment, detector 130 measures a magnitude of the x-polarized light (x-pol) and detector 132 measures a magnitude of the y-polarized light (y-pol). Based upon the measured magnitudes of the x and y-polarized light, optical sensor 106 outputs an signal indicating the electrical current of conductor 138. Operation of optical sensors 108 and 110 is similar to that of optical sensor 106, as described above, except optical sensor 108 measures the current of conductor 140 and optical sensor 110 measures the current of conductor 142. In one embodiment, the electrical current phase of each conductor 138, 140 and 142 is different. In one embodiment, one or more of the optical sensors 106, 108, and 110 has a clockwise wound fiber optic loop and others of the optical sensors may have an anticlockwise wound fiber optic loop.

Figure 4:
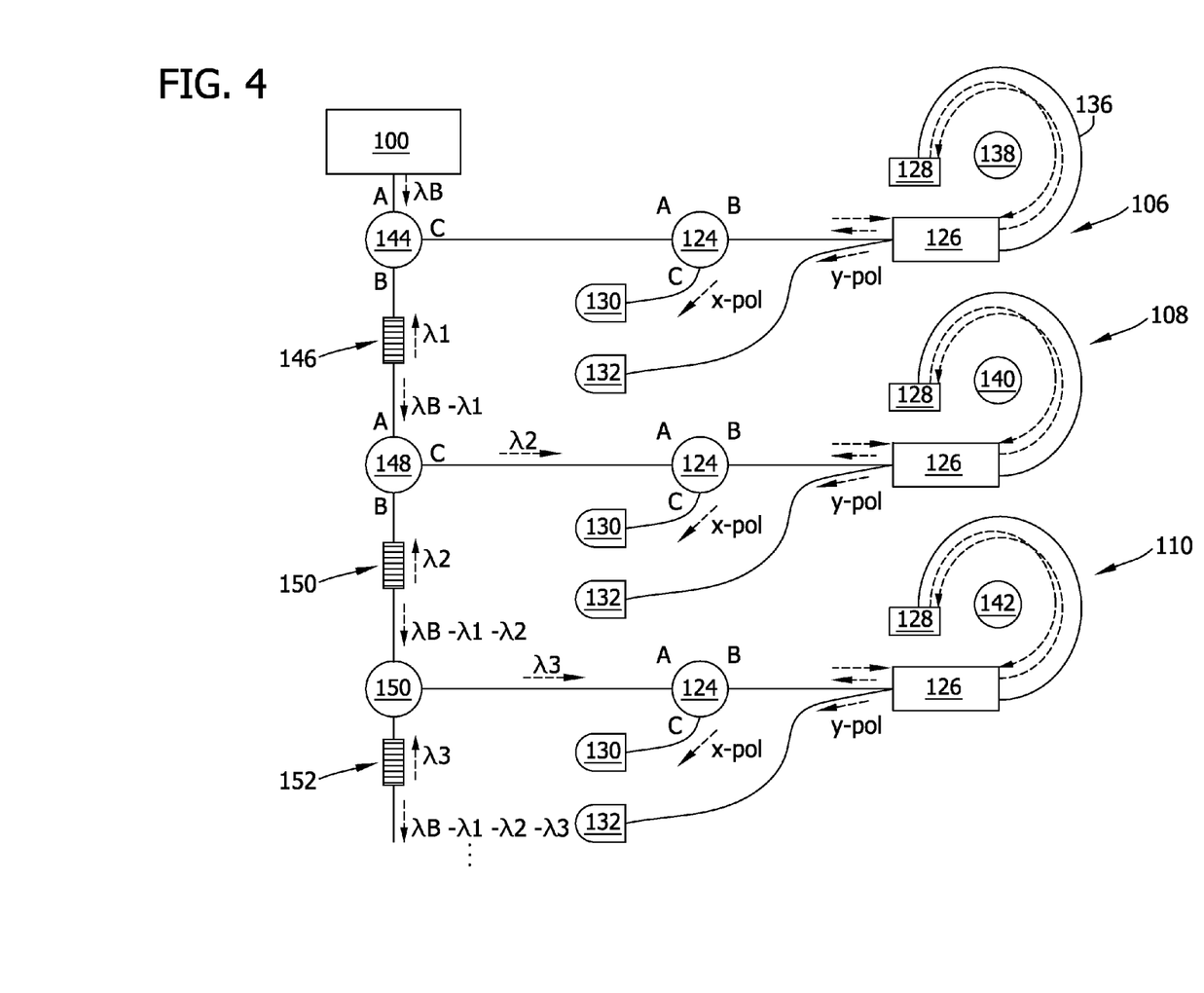
FIG. 4 shows an exemplary embodiment of the system of FIG. 1 using wavelength division multiplexing.

FIG. 4 shows an embodiment of the light based electrical parameter measurement system using wavelength division multiplexing. Broadband light source 100 outputs a broadband light signal to input port A of circulator 144. Circulator 144 outputs the broadband light signal having broadband wavelengths $\lambda B$ through port B into wavelength filter 146. In one embodiment, wavelength filter 146 is a fiber Bragg grating. Wavelength filter 146 reflects light having wavelength $\lambda 1$ and allows all other wavelengths of the broadband light to pass through to port A of circulator 148. Light having wavelength $\lambda 1$ is reflected back through port B of circulator 144 and is output through port C into optical sensor 106. Optical sensor 106 operates as discussed above, except in this embodiment, detector 130 measures a magnitude of the x-polarized light having only wavelength $\lambda 1$ and detector 132 measures a magnitude of the y-polarized light having wavelength $\lambda 1$. Based upon the measured magnitudes of the x and y-polarized light having wavelength $\lambda 1$, optical sensor 106 outputs a signal indicating an electrical current of conductor 138.

Circulator 148 outputs light of wavelength $\lambda 1$ through port B to wavelength filter 150. Wavelength filter 150 is configured to pass all wavelengths of light therethrough except $\lambda 2$, which is reflected back through port B of circulator 148 and is output through port C of circulator 148 into optical sensor 108. Optical sensor 108 operates as discussed above, except in this embodiment, detector 130 measures a magnitude of the x-polarized light having wavelength $\lambda 2$ and detector 132 measures a magnitude of the y-polarized light having wavelength $\lambda 2$. Based upon the measured magnitudes of the x and y-polarized light having wavelength $\lambda 2$, optical sensor 108 outputs a signal indicating an electrical current of conductor 140. The light output from wavelength filter 150 (having wavelengths $\lambda B$-$\lambda 1$-$\lambda 2$) enters wavelength filter circulator 150 and passes through port B into wavelength filter 152, which allows all wavelengths of light to pass therethrough except wavelength $\lambda 3$, which is reflected back through port B of circulator 150 and is output through port C of circulator 150 into optical sensor 110. Optical sensor 110 operates as discussed above, except in this embodiment, detector 130 measures a magnitude of the x-polarized light having wavelength $\lambda 3$ and detector 132 measures a magnitude of the y-polarized light having wavelength $\lambda 3$. Based upon the measured magnitudes of the x and y-polarized light having wavelength $\lambda 3$, optical sensor 110 outputs a signal indicating an electrical current of conductor 140. The light may then be passed on to additional circulators, wavelength filters and optical sensors in order to measure an electrical parameter, such as current, of additional conductors.

In another embodiment, circulator 144 and wavelength filter 146 are replaced by a coupler device (not shown) that divides the broadband light by intensity, which transmits a predetermined percentage of the broadband light to circulator 124, and a remainder of the light to circulator 148. Similarly, one or more of circulator 148 and wavelength filter 150 or circulator 150 and wavelength filter 152 are replaced by a coupler device.

Figure 5:
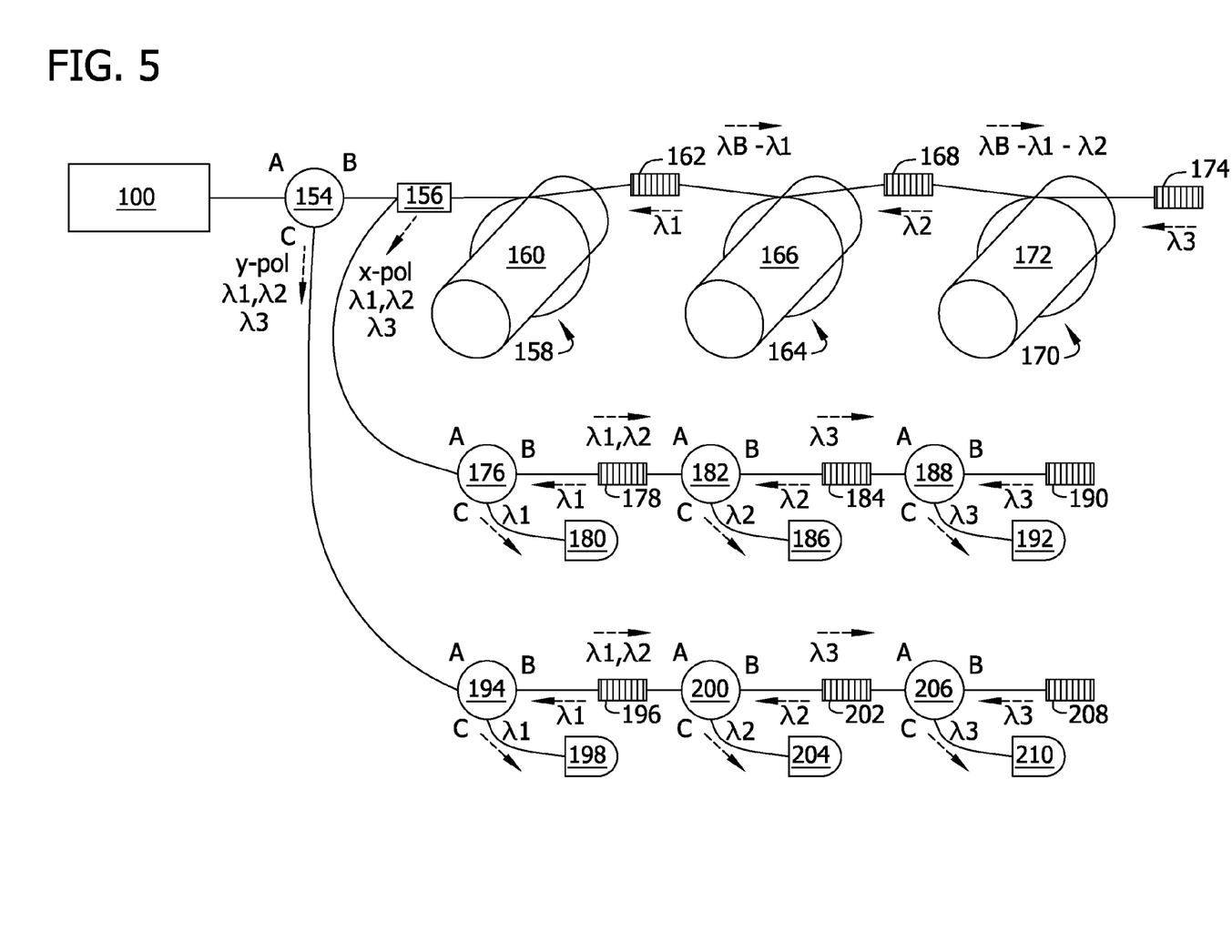
FIG. 5 shows an exemplary embodiment of the system of FIG. 1 using wavelength division multiplexing.

FIG. 5 shows another embodiment of the light based electrical parameter measurement system using wavelength division multiplexing. In this embodiment, broadband light source 100 outputs light having broadband wavelengths $\lambda B$ to circulator 154, which outputs light having wavelengths $\lambda B$ to an FOCT 158 having a conductor 160 passing therethrough. The light having wavelengths $\lambda B$ is transmitted to wavelength filter 162, which is configured to reflect light having wavelength $\lambda 1$ and pass all other wavelengths therethrough. Thus, light having wavelength $\lambda 1$ has its polarization angle rotated in accordance with the Faraday principle by FOCT 158 and is reflected back to optical box 156. Light having wavelengths $\lambda B$-$\lambda 1$ is passed through wavelength filter 162 into FOCT 164 (conductor 166 passes through FOCT 164). The light of wavelengths $\lambda B$-$\lambda 1$ is transmitted to wavelength filter 168, which is configured to reflect light of wavelength $\lambda 2$, and pass through all other wavelengths of light. Thus, light having wavelength $\lambda 2$ has its polarization angle rotated in accordance with the Faraday principle by both FOCT 164 and FOCT 158 and is reflected back to optical box 156. Light of wavelengths $\lambda B$-$\lambda 1$-$\lambda 2$ is passed through wavelength filter 168 into FOCT 170 (conductor 172 passes through FOCT 170). The light of wavelengths $\lambda B$-$\lambda 1$-$\lambda 2$ is transmitted to wavelength filter 174, which is configured to reflect light of wavelength $\lambda 3$, and pass through all other wavelengths of light. Thus, light having wavelength $\lambda 3$ has its polarization angle rotated in accordance with the Faraday principle by each of FOCT 170, FOCT 164 and FOCT 158 and is reflected back to optical box 156. In one embodiment, light of wavelengths $\lambda B$-$\lambda 1$-$\lambda 2$-$\lambda 3$ is passed through wavelength filter 174 into additional FOCTs and wavelength filters.

Light having wavelengths $\lambda 1$, $\lambda 2$, and $\lambda 3$ is reflected back through optical box 156, which routes x-polarized light of wavelengths $\lambda 1$, $\lambda 2$, and $\lambda 3$ to circulator 176. Circulator 176 routes x-polarized light of wavelengths $\lambda 1$, $\lambda 2$, and $\lambda 3$ to wavelength filter 178, which is configured to reflect light of wavelength $\lambda 1$ and pass all other wavelengths therethrough. Reflected light having wavelength $\lambda 1$ passes through circulator 176 into detector 180, which measures a magnitude of the x-polarized light having wavelength $\lambda 1$. X-polarized light having wavelengths $\lambda 2$ and $\lambda 3$ are transmitted to circulator 182 and wavelength filter 184. Wavelength filter 184 is configured to reflect light of wavelength $\lambda 2$ and pass all other wavelengths of light therethrough. Reflected light having wavelength $\lambda 2$ passes through circulator 182 into detector 186, which measures a magnitude of the x-polarized light having wavelength $\lambda 2$. X-polarized light having wavelength $\lambda 3$ is transmitted to circulator 188 and wavelength filter 190. Wavelength filter 190 is configured to reflect light of wavelength $\lambda 3$ and pass all other wavelengths of light therethrough. Reflected light having wavelength $\lambda 3$ passes through circulator 188 into detector 192, which measures a magnitude of the x-polarized light having wavelength $\lambda 3$.

To measure the y-polarized light, light having wavelengths $\lambda 1$, $\lambda 2$, and $\lambda 3$ is reflected back through optical box 156, which routes y-polarized light of wavelengths λ1, λ2, and λ3 to circulator 194. Circulator 194 routes y-polarized light of wavelengths λ1, λ2, and λ3 to wavelength filter 196, which is configured to reflect light of wavelength λ1 and pass all other wavelengths therethrough. Reflected light having wavelength λ1 passes through circulator 194 into detector 198, which measures a magnitude of the y-polarized light having wavelength λ1. Y-polarized light having wavelengths λ2 and λ3 are transmitted to circulator 200 and wavelength filter 202. Wavelength filter 202 is configured to reflect light of wavelength λ2 and pass all other wavelengths of light therethrough. Reflected light having wavelength λ2 passes through circulator 200 into detector 204, which measures a magnitude of the y-polarized light having wavelength λ2. Y-polarized light having wavelength λ3 is transmitted to circulator 206 and wavelength filter 208. Wavelength filter 208 is configured to reflect light of wavelength λ3 and pass all other wavelengths of light therethrough. Reflected light having wavelength λ3 passes back through circulator 206 into detector 210, which measures a magnitude of the y-polarized light having wavelength λ3.

In the embodiment of FIG. 5, electrical currents of conductors 160, 166 and 172 are measured, respectively, based upon the measured magnitudes of the x and y-polarized light having wavelengths λ1, λ2, and λ3. For example, current of conductor 160 is based upon a calculation of wavelength λ1, current of conductor 166 is based upon a calculation of wavelengths λ1 and λ2, and current of conductor 172 is based upon a calculation of wavelengths λ1, λ2 and λ3.

Figure 6:
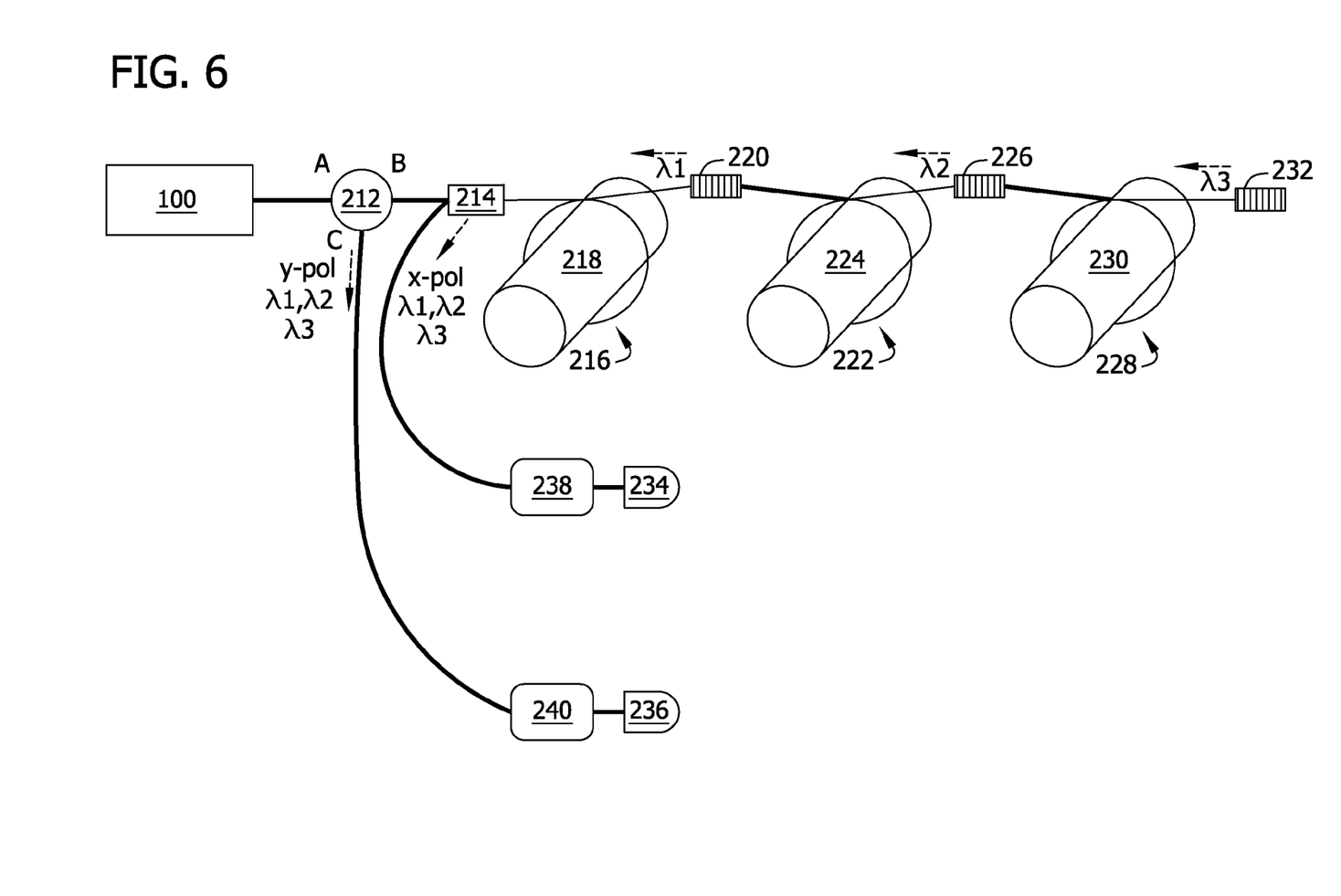
FIG. 6 shows an exemplary embodiment of the system of FIG. 1 using time division multiplexing.

FIG. 6 shows an embodiment of the light based electrical parameter measurement system using time division multiplexing. In this embodiment, broadband light source 100 outputs a time modulated light signal having wavelengths λB, which is transmitted to port A of circulator 212 and output from circulator 212 through port B. The light signal having wavelengths λB enters optical box 214 and is routed to an FOCT 216 having a conductor 218 passing therethrough. The light enters wavelength filter 220, which is configured to reflect light having wavelength λ1 and pass all other wavelengths therethrough. Thus, light having wavelength λ1 has its polarization angle rotated in accordance with the Faraday principle by FOCT 216 and is reflected back to optical box 214 at a first time T1. Light of wavelengths λB-λ1 are passed through wavelength filter 220 into FOCT 222, having conductor 224 passing therethrough. The light of wavelengths λB-λ1 is transmitted to wavelength filter 226, which is configured to reflect light of wavelength λ2, and pass through all other wavelengths of light. Thus, light having wavelength λ2 has its polarization angle rotated in accordance with the Faraday principle by both FOCT 222 and FOCT 216 and is reflected back to optical box 214 at a later time T2 than light of wavelength λ1. Light of wavelengths λB-λ1-λ2 is passed through wavelength filter 226 into FOCT 228, having conductor 230 passing therethrough. The light of wavelengths λB-λ1-λ2 is transmitted to wavelength filter 232, which is configured to reflect light of wavelength λ3, and pass through all other wavelengths of light. Thus, light having wavelength λ3 has its polarization angle rotated in accordance with the Faraday principle by each of FOCT 228, FOCT 222 and FOCT 216 and is reflected back to optical box 214 at a later time T3 than light of wavelength λ2. Optical box 214 transmits x-polarized light of wavelength λ1 at time T1 to detector 234 and transmits y-polarized light of wavelength λ3 at time T1 to detector 236. Optical box 214 transmits x-polarized light of wavelength λ2 at time T2 to detector 234 and transmits y-polarized light of wavelength λ2 at time T2 to detector 236. Optical box 214 transmits x-polarized light of wavelength λ3 at time T3 to detector 234 and transmits y-polarized light of wavelength λ3 at time T3 to detector 236. Based upon the measured magnitudes of the x and y-polarized light having wavelengths λ1, λ2, and λ3, an electrical current of conductors 218, 224 and 230 are measured.

In one embodiment, fiber optic cable of one or more of FOCTs 216, 222 and 228 are flint glass fiber and other fiber optic cables of the system are single mode fibers or polarization maintaining fibers. In one embodiment, one or more of wavelength filters 220, 226 and 232 is replaced by a partially reflecting thin film.

In another embodiment, tunable filters 238 and 240 are disposed between optical box 214 and detectors 234 and 236, respectively. The tunable filters are operable to allow a user selected wavelength to pass through the tunable filter, for example one or more of λ1, λ2, and λ3. Tunable filters 238 and 240 thus facilitate measuring the current of one or more of conductors 218, 224 and 230. For example, using tunable filters 238 and 240 set to wavelength λ1, a user measures the current of only conductor 218 (i.e., by operating the tunable filters to filter all wavelengths except λ1, which is allowed to pass through to detectors 234 and 236).

In one embodiment, one or more of the FOCTs has a clockwise wound fiber optic loop and others of the FOCTs have an anticlockwise wound fiber optic loop. The fiber optic loop wound clockwise rotates the polarization angle of the light at a first angle, and the anticlockwise wound fiber optic loop rotates the polarization angle 180 degrees relative to the clockwise wound fiber optic loop.

In some embodiments, the above described systems and methods are computer controlled. The computer controlled embodiments described herein are not limited to any particular system controller or processor for performing the processing tasks described herein. The term controller or processor, as used herein, is intended to denote any machine capable of performing the calculations, or computations, necessary to perform the tasks described herein. The terms controller and processor also are intended to denote any machine capable of accepting a structured input and of processing the input in accordance with prescribed rules to produce an output. It should also be noted that the phrase "configured to" as used herein means that the controller/processor is equipped with a combination of hardware and software for performing the tasks of embodiments of the invention, as will be understood by those skilled in the art. The term controller/processor, as used herein, refers to central processing units, microprocessors, microcontrollers, reduced instruction set circuits (RISC), application specific integrated circuits (ASIC), logic circuits, and any other circuit or processor capable of executing the functions described herein.

The computer implemented embodiments described herein embrace one or more computer readable media, including non-transitory computer readable storage media, wherein each medium may be configured to include or includes thereon data or computer executable instructions for manipulating data. The computer executable instructions include data structures, objects, programs, routines, or other program modules that may be accessed by a processing system, such as one associated with a general-purpose computer capable of performing various different functions or one associated with a special-purpose computer capable of performing a limited number of functions. Aspects of the disclosure transform a general-purpose computer into a special-purpose computing device when configured to execute the instructions described herein. Computer executable instructions cause the processing system to perform a particular function or group of functions and are examples of program code means for implementing steps for methods disclosed herein. Furthermore, a particular sequence of the executable instructions provides an example of corresponding acts that may be used to implement such steps. Examples of computer readable media include random-access memory ("RAM"), read-only memory ("ROM"), programmable read-only memory ("PROM"), erasable programmable read-only memory ("EPROM"), electrically erasable programmable read-only memory ("EEPROM"), compact disk read-only memory ("CD-ROM"), or any other device or component that is capable of providing data or executable instructions that may be accessed by a processing system.

A computer or computing device such as described herein has one or more processors or processing units, system memory, and some form of computer readable media. By way of example and not limitation, computer readable media comprise computer storage media and communication media. Computer storage media include volatile and nonvolatile, removable and non-removable media implemented in any method or technology for storage of information such as computer readable instructions, data structures, program modules or other data. Communication media typically embody computer readable instructions, data structures, program modules, or other data in a modulated data signal such as a carrier wave or other transport mechanism and include any information delivery media. Combinations of any of the above are also included within the scope of computer readable media.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A measurement system comprising:
    a broadband light source that outputs a broadband light;
    an optical splitter that divides the broadband light into a plurality of divided light beams; and
    a plurality of optical sensors, each optical sensor comprising a fiber optic current transducer that comprises a fiber optic cable configured to substantially surround a conductor, the fiber optic current transducer configured to receive a single one of the divided light beams and configured to measure an electrical parameter of the conductor by:
        splitting the divided light beam into a first polarization component and a second polarization component that is orthogonal to the first polarization component; and
        measuring a magnitude of the first polarization component and a magnitude of the second polarization component after the first and second polarization components are transmitted through the fiber optic cable.

2. The measurement system according to claim 1, wherein the optical splitter is a light intensity splitter configured to divide the broadband light into a plurality of light beams having a sum of intensities equal to an intensity of the broadband light.

3. The measurement system according to claim 2, wherein the electrical parameter is current.

4. The measurement system according to claim 1, wherein each fiber optic current transducer is coupled to the optical splitter by an additional fiber optic cable.

5. The measurement system according to claim 1, wherein an optical circulator is disposed between the optical splitter and each of the optical sensors.

6. The measurement system according to claim 1, wherein the broadband light source is one of a super luminescent diode (SLD) and an amplified spontaneous emission (ASE).

7. A measurement system comprising:
    a broadband light source that outputs a broadband light;
    an optical splitter that divides the broadband light into a plurality of divided light beams based upon wavelength; and
    a plurality of optical sensors, each optical sensor comprising a fiber optic current transducer that comprises a fiber optic cable configured to substantially surround a conductor, the fiber optic current transducer configured to receive a single one of the divided light beams and measure an electrical parameter of the conductor using the received light beam by:
        splitting the divided light beam into a first polarization component and a second polarization component that is orthogonal to the first polarization component; and
        measuring a magnitude of the first polarization component and a magnitude of the second polarization component after the first and second polarization components are transmitted through the fiber optic cable.

8. The measurement system according to claim 7, wherein the optical splitter comprises an optical circulator and a wavelength filter for each divided light beam.

9. The measurement system according to claim 7, wherein the optical circulators and the wavelength filters are connected in a series configuration.

10. The measurement system according to claim 7, wherein each of the optical sensors is connected in a series configuration and a wavelength filter is disposed between each of the optical sensors.

11. The measurement system according to claim 10, further comprising at least one circulator disposed between each of the optical sensors.

12. The measurement system according to claim 7, wherein a first one of the fiber optic current transducers comprises a clockwise wound fiber optic loop and a second one of the fiber optic current transducers comprises an anticlockwise wound fiber optic loop.

13. A method of measuring an electrical parameter using an optical sensor comprising:
    outputting a broadband light from a single broadband light source;
    dividing the broadband light into a plurality of divided light beams based upon a predetermined characteristic of the light;
    supplying the divided light beams to a plurality of optical sensors;
    passing a conductor through at least one of the optical sensors; and
    measuring an electrical parameter of the conductor by:
        splitting the divided light beam into a first polarization component and a second polarization component that is orthogonal to the first polarization component; and
        measuring a magnitude of the first polarization component and a magnitude of the second polarization component after the first and second polarization components are transmitted through a fiber optic cable that substantially surrounds the conductor.

14. The method according to claim 13, wherein the predetermined characteristic of light is a wavelength.

15. The method according to claim 13, wherein the predetermined characteristic of light is intensity.

16. The method according to claim 13, wherein the predetermined characteristic of light is time.

17. The method according to claim 13, wherein the electrical parameter is current.

18. The method according to claim 17, wherein at least two phases of current are measured.

19. The measurement system of claim 1, wherein each optical sensor comprises:
   a first detector configured to measure the magnitude of the first polarization component; and
   a second detector configured to measure the magnitude of the second polarization component.

20. The measurement system of claim 7, wherein each optical sensor comprises:
   a first detector configured to measure the magnitude of the first polarization component; and
   a second detector configured to measure the magnitude of the second polarization component.

\* \* \* \* \*

UNITED STATES PATENT AND TRADEMARK OFFICE
CERTIFICATE OF CORRECTION

PATENT NO. : 8,781,266 B2
APPLICATION NO. : 13/336519
DATED : July 15, 2014
INVENTOR(S) : Lee et al.

Page 1 of 1

It is certified that error appears in the above-identified patent and that said Letters Patent is hereby corrected as shown below:

In the Drawings

In Fig. 4, Sheet 4 of 6, delete "  " and insert --  --, therefor.

In the Specification

In Column 3, Line 43, delete "$\lambda 1$" and insert -- $\lambda B$-$\lambda 1$ --, therefor.

In Column 3, Lines 56-57, delete "circulator 150" and insert -- circulator 151 --, therefor.

In Column 3, Line 60, delete "circulator 150" and insert -- circulator 151 --, therefor.

In Column 3, Lines 60-61, delete "circulator 150" and insert -- circulator 151 --, therefor.

In Column 4, Line 11, delete "circulator 150" and insert -- circulator 151 --, therefor.

In Column 5, Line 63, delete "$\lambda 3$" and insert -- $\lambda 1$ --, therefor.

Signed and Sealed this
Thirty-first Day of March, 2015

Michelle K. Lee
*Director of the United States Patent and Trademark Office*

UNITED STATES PATENT AND TRADEMARK OFFICE
CERTIFICATE OF CORRECTION

| | |
|---|---|
| PATENT NO. | : 8,781,266 B2 |
| APPLICATION NO. | : 13/336519 |
| DATED | : July 15, 2014 |
| INVENTOR(S) | : Lee et al. |

It is certified that error appears in the above-identified patent and that said Letters Patent is hereby corrected as shown below:

On the title page, in the illustrative figure, delete "(150)" and insert -- (151) --.

In the Drawings

In Fig. 4, Sheet 4 of 6, delete "(150)" and insert -- (151) --, therefor.

In the Specification

In Column 3, Line 43, delete "$\lambda 1$" and insert -- $\lambda B$-$\lambda 1$ --, therefor.

In Column 3, Lines 56-57, delete "circulator 150" and insert -- circulator 151 --, therefor.

In Column 3, Line 60, delete "circulator 150" and insert -- circulator 151 --, therefor.

In Column 3, Lines 60-61, delete "circulator 150" and insert -- circulator 151 --, therefor.

In Column 4, Line 11, delete "circulator 150" and insert -- circulator 151 --, therefor.

In Column 5, Line 63, delete "$\lambda 3$" and insert -- $\lambda 1$ --, therefor.

This certificate supersedes the Certificate of Correction issued March 31, 2015.

Signed and Sealed this
Twenty-first Day of April, 2015

Michelle K. Lee
*Director of the United States Patent and Trademark Office*